May 8, 1951 M. H. GRAHAM 2,552,169
COFFEE MAKER
Filed Aug. 28, 1944 7 Sheets-Sheet 1

Inventor
MAURICE H. GRAHAM
By Parry & Miller
Attorneys

May 8, 1951 M. H. GRAHAM 2,552,169
COFFEE MAKER

Filed Aug. 28, 1944 7 Sheets-Sheet 2

Inventor
MAURICE H. GRAHAM
By Parry & Miller
Attorneys

May 8, 1951 M. H. GRAHAM 2,552,169
COFFEE MAKER
Filed Aug. 28, 1944 7 Sheets-Sheet 3

Inventor
MAURICE H. GRAHAM
By Parry & Miller
Attorneys

May 8, 1951 — M. H. GRAHAM — 2,552,169
COFFEE MAKER
Filed Aug. 28, 1944 — 7 Sheets-Sheet 4

INVENTOR:-
MAURICE H. GRAHAM
BY Parry & Miller
ATTYS.

May 8, 1951  M. H. GRAHAM  2,552,169
COFFEE MAKER

Filed Aug. 28, 1944  7 Sheets-Sheet 5

INVENTOR:-
MAURICE H. GRAHAM
BY Parry + Miller ATTYS.

May 8, 1951 M. H. GRAHAM 2,552,169
COFFEE MAKER
Filed Aug. 28, 1944 7 Sheets-Sheet 6

FIG.16

INVENTOR:-
MAURICE H. GRAHAM
BY Parry & Miller
ATTYS.

May 8, 1951 M. H. GRAHAM 2,552,169
COFFEE MAKER
Filed Aug. 28, 1944 7 Sheets-Sheet 7

INVENTOR:-
MAURICE H. GRAHAM
BY Parry + Miller ATTYS.

Patented May 8, 1951

2,552,169

UNITED STATES PATENT OFFICE 2,552,169

COFFEE MAKER

Maurice H. Graham, St. Louis Park, Minn.

Application August 28, 1944, Serial No. 551,507

15 Claims. (Cl. 99—282)

This invention relates to coffee makers, and directed to improved mechanism for circulating and infusing the coffee making liquid.

The general object of the invention is to provide a coffee maker in which coffee making liquid is circulated through the coffee grounds at a relatively high flow velocity and in such manner as to provide a more efficient extraction.

The invention contemplates a novel and improved coffee holding infusion unit in which the liquid passes upwardly, instead of downwardly, through the bed of coffee grounds and delivered to a storage chamber from the upper end of the unit.

The invention further contemplates improved power driven pumping mechanism for circulating the liquid through the coffee. Such mechanism combines the advantages of high circulation pumping capacity with an arrangement of the pump and pump driving mechanism which avoids the numerous disadvantages of prior power driven pump coffee makers.

As in my prior pending application, Serial No. 438,029, filed April 7, 1942, now Patent No. 2,356,784, granted August 29, 1944, of which the present application is a continuation-in-part, the power driven pump mechanism includes a pump located within the coffee maker which is driven magnetically from an exterior power source and without the necessity of extending a shaft or other positive drive coupling into the coffee maker. While the present magnetically driven pump mechanism is generally similar to that in such prior application, the same is substantially more efficient in circulating capacity despite the very compact lightweight design which is very desirable for a coffee maker.

As will hereafter become apparent, the invention is applicable to coffee makers constructed both of metal and glass. Further, electric heating units may be permanently associated with a coffee maker embodying the invention, or an electric heating unit may be employed in a base stove from which the coffee maker is removable. Automatic control means may be, and preferably are, provided to control both the pumping mechanism and the heating mechanism to the end that the invention provide a fully automatic coffee maker.

The above and other objects and features of the invention will be more fully understood by reference to the embodiments shown in the accompanying drawings.

The coffee maker shown in Figs. 1 to 9 includes a metal pot 30 upstanding from an integral hollow base 31 and having a liquid storage chamber 32 in its lower portion. The bottom portion 33 of the vessel is of reduced cross-section and surrounded by an electric heating coil 34. Projecting from the base portion 33 is a relatively small well 35 in which is removably fitted a small housing 36 having specially formed threaded cap 37.

Figure 1:
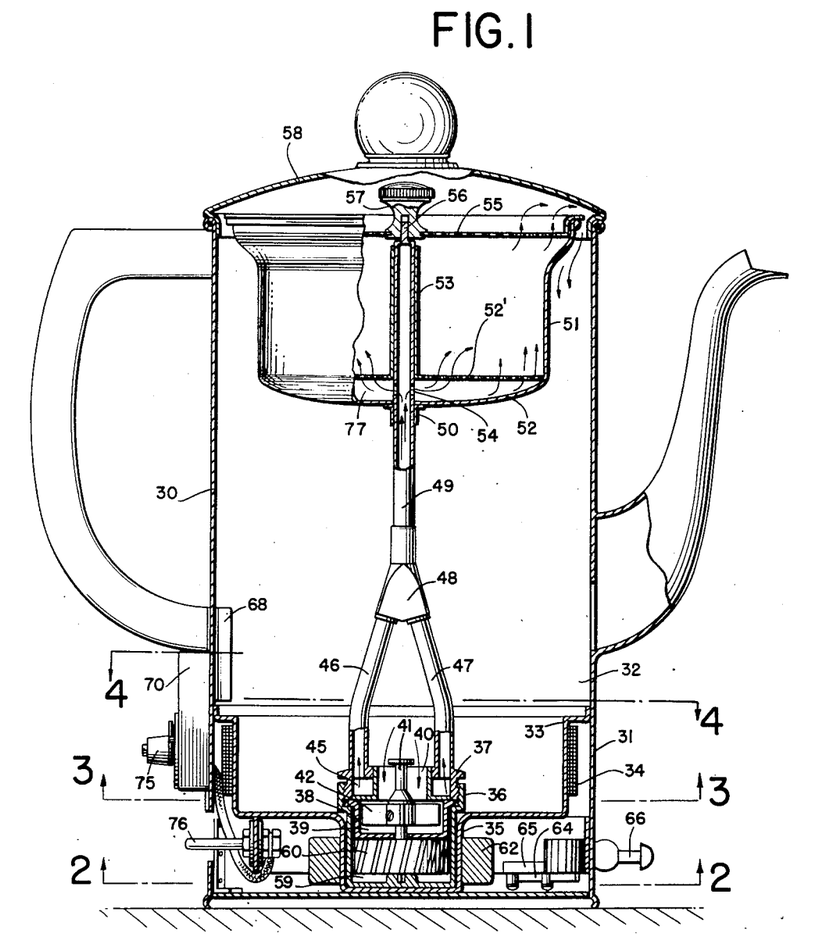
Fig. 1 is a sectional elevation of a coffee maker according to the invention.

A removable cup 38 depends from a shoulder in housing 36 to form a pump chamber 39. An inlet port 40 located centrally of cap 37 conducts liquid from storage reservoir 32 to pump chamber 39. Journalled in the bottom of housing 36 and extending upwardly therethrough is a rotatable shaft 41. Fixed to such shaft in pump chamber 39 is a rotary bladed pump member 42.

Figures 4, 5, 6, 7, 9:
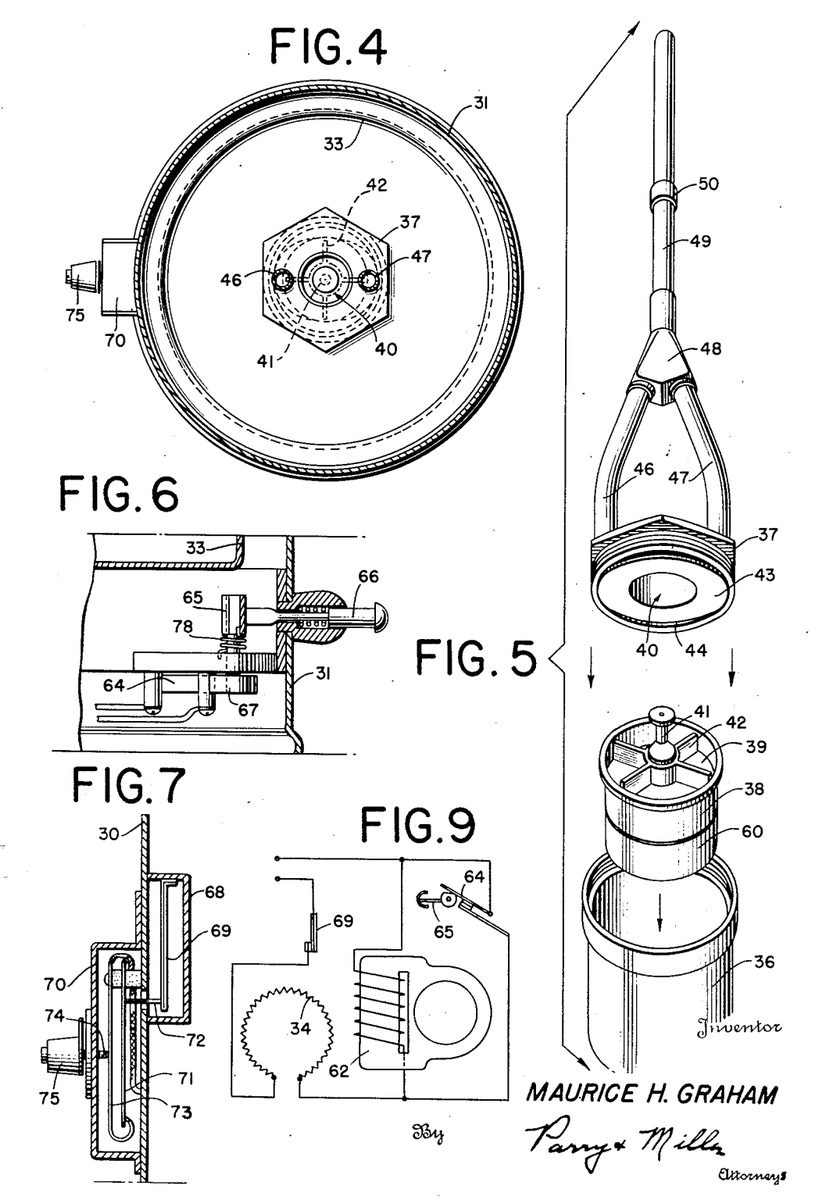
Fig. 4 is a further cross-section taken at line 4—4 of Fig. 1.
Fig. 5 is an expanded perspective view of the disassembled parts of the liquid circulating mechanism.
Fig. 6 is an enlarged fragmentary vertical section taken at line 6—6 of Fig. 2 showing details of a control switch.
Fig. 7 is a fragmentary vertical section showing details of the thermostatic control.
Fig. 9 is a diagrammatic view of the control circuit.
Figure 8:
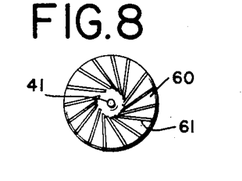
Fig. 8 is a plan view of the motor rotor for driving the pump mechanism.
Figure 10:
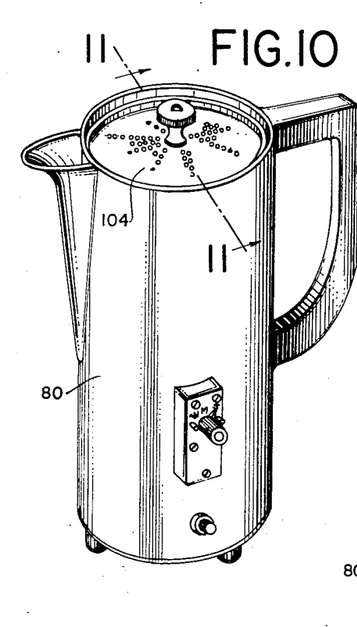
Fig. 10 is a perspective view of a further embodiment of coffee maker embodying the invention.

As best shown in Figs. 1 and 5, housing cap 37 is of hollow circular cross-section and fitted with an insert defining liquid inlet port 40 and having a flange 43 of oval cross-section. Such flange forms with the cap a liquid outlet chamber 45 to which liquid is pumped from the pump chamber through the diametrically opposite openings between the flange and the cap wall.

Upstanding from cap 37 and communicating with pump discharge chamber 45 are a pair of conduits 46 and 47 which merge at union 48 from which extends upwardly a further single conduit 49. It will be seen that housing 36, the pump mechanism and conduits 46, 47 and 49 constitute a single unit which is removable as such from the vessel.

Supported in the upper portion of vessel 30 removably on conduit 49 by flange 50 is a coffee holding infusion unit 51. Whereas conventional coffee holders have perforate walls and liquid enters the upper end thereof and flows downwardly through the coffee grounds and out through the wall perforations, the present coffee holder 51 has imperforate bottom and side walls. Mounted in the lower portion of holder 51 in spaced relation to the bottom wall 52 is a perforate disc 52' which provides a support for the bed of coffee grounds. Such disc is removably mounted on the upper portion of conduit 49 by a thimble 53. Formed between bottom 52 and disc 52' is a liquid entrance chamber 77 to which liquid is delivered from tube 49 through a series of ports 54. The liquid is thus able to penetrate throughout the entire width of holder 51 so as to be pumped upwardly throughout the entire area of the bed of coffee grounds. After being infused the liquid is discharged from holder 51 at a point somewhat above the level of the bed of coffee grounds. While a series of discharge openings may be provided in the side of holder 51 near the top thereof, it is preferred to make the side wall imperforate throughout its height and to provide the upper end of the holder with a second perforate disc 55 detachably mounted by a securing element 56 on the closed upper end of conduit 49 and knob 57 fixed to the center of such disc.

Through the mechanism just described it will be understood that liquid from storage chamber 32 is repeatedly circulated by the pump mechanism upwardly through conduits 46, 47 and 49 into the lower portion of the coffee holding infusion unit 51, enters the infusion unit below the coffee bed, flows upwardly through disc 52' and the bed of coffee grounds, thence upwardly through top disc 55 and then discharges over the top edge of the unit and thence back to storage chamber 32. The pump mechanism is capable of delivering liquid in a steady stream of fairly high velocity so that liquid flows upwardly through the infusion unit in considerable volume. The coffee grounds, instead of packing down and tending to escape into the storage reservoir as in the case of conventional infusion units is buoyed up by the upwardly flowing liquid. Because the grounds are thus more widely distributed in the unit a greater degree of contact with the liquid is possible and a more efficient extraction is obtained. Disc 55 serves to prevent escape of coffee grounds from the unit, and it is found that coffee infusion is substantially clearer from that obtained from conventional coffee makers of the recirculating type.

While the flow of liquid upwardly through the infusion unit is relatively rapid it is steady and smooth, thus contributing to the efficiency of the infusing operation and deterring the escape of grounds. Whereas in conventional circulating type coffee makers liquid pumped upwardly from the storage chamber is projected against the top of the coffee makers, in the present case the infused liquid merely flows gently over the top edge of unit 51 without impinging on vessel lid 58.

Figure 2:
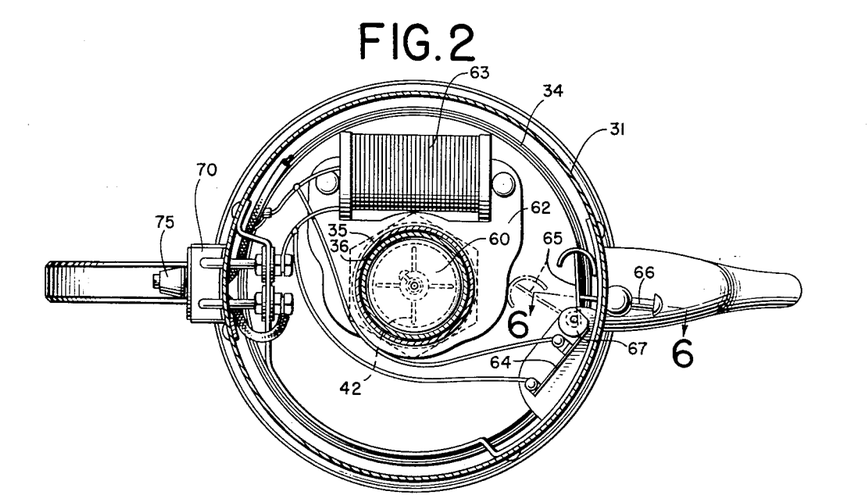
Fig. 2 is a cross-section taken at line 2—2 of Fig. 1 showing certain details of the pump power unit and control mechanism.
Figure 3:
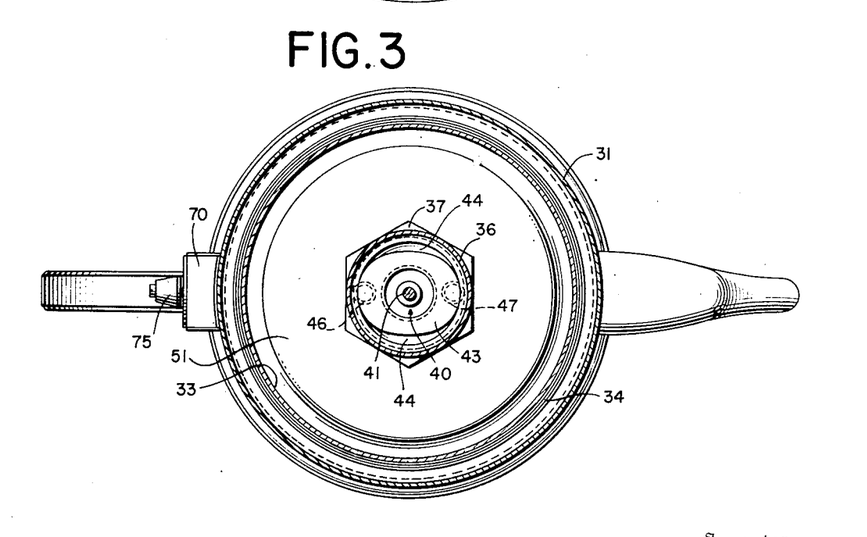
Fig. 3 is a cross-section taken at line 3—3 of Fig. 1.

Located in housing 36 and separated from pump chamber 39 by cup 38 is a chamber 59 in which is located rotor 60 of an induction electric motor. Such rotor is fixed to shaft 41 and serves to drive rotary pump member 42. Located externally of the bottom portion 33 of vessel 30 and encased in base portion 31 is electric motor stator 62. As best shown in Figs. 1 and 2 the core of such stator surrounds well 35 in the plane of rotor 60 contained in housing 36. Field core 63 sets up a magnetic field in the motor core which penetrates the intervening walls of well 35 and housing 36 to effect rotation of motor rotor 60 and pump member 42. Rotor 60 is preferably comprised of a laminated series of steel discs slotted angularly both to the axis and radius of the rotor to receive copper inserts 61, all as will be clear from Figs. 1 and 8. The inserts 61 are extended inwardly almost to the center of the rotor as it has been found that through such expedient the speed and power of the motor is markedly increased.

A motor controlled switch 64 is mounted on a suitable bracket in base 31 as shown in Figs. 1, 2 and 6. Such switch is normally closed and caused to open by pivoted arm 65 through cam 67 by manual operation of push button 66. When arm 65 is pushed over to the dotted line position shown in Fig. 2 the motor is energized and magnetically holds arm 65 against the core as long as the motor is operating. When the motor is deenergized spring 78 serves to swing arm 65 outwardly and switch 64 closes.

A thermostatic switch is employed to control operation of both heater 34 and the pump driving motor. As best shown in Fig. 7 this includes a bimetal thermostat 69 located in a water tight casing 68 in the side wall of vessel 30 so that the thermostat will be responsive to the temperature of the liquid in storage chamber 32. Located in a second casing 70 on the outer side of the vessel wall is a switch arm 71 actuatable by thermostat 69 through pin 72. Swinging of arm 71 makes and breaks contact with a second switch arm 73. Screw threaded into casing 70 is a shaft 74 which can be rotated through control knob 75 to adjust the position of switch arm 73 the same determining the period of operation of the motor and heater.

By reference to the wiring diagram shown in Fig. 9 the automatic operation of the coffee maker will be understood. Assuming that the bed of coffee grounds has been placed in infusion unit 51 and an appropriate quantity of water introduced into storage chamber 72, the coffee maker is plugged in by electric terminal 76 located in the base 31 and connected to an electric power source. At this time the thermostatic switch is closed, also the push button switch. Heater 34 is immediately energized, but since switch 64 short circuits the pump motor the latter remains inoperative until push button 66 is actuated. This is preferably done immediately since the water in the storage chamber heats quite rapidly. As soon as the motor is energized the pump starts operating to effect repeated separation of liquid from the storage chamber upwardly through the infusion unit and back to the storage chamber. After the infusion has been completed to the strength desired as determined by the setting of switch arm 73 by control knob 75, thermostatic switch 69 opens in response to the heat of the infusion liquid in the storage chamber. Both heater 34 and the motor stator 62 are deenergized. The infusion may automatically be kept warm for an indefinite period. When the liquid tends to cool slightly thermostat switch 69 will close to reenergize heater 34 and open again when the proper temperature has again been reached. It may be noted that closing of thermostatic switch 69 does not reenergize the pump motor since further circulation of liquid through coffee grounds once the proper strength has been reached is undesirable. The motor remains short-circuited by switch 64 and will not be reenergized unless and until push button 66 is again operated.

The further coffee maker as shown in Figs. 10 to 15 is generally similar to that just described with certain differences and improvements in detailed structure. The same includes a metal coffee making vessel 80 having a hollow base 81 and housing a liquid storage reservoir 82. Reduced bottom portion 83 of the vessel is surrounded by an electric heating coil 84. A central relatively small depending well 85 itself forms a chamber 86 fitted with a removable specially formed cap 87. The central portion of the cap is provided with a series of openings constituting ports 88 through which water from storage chamber 82 enters chamber 86. At the center of the cap is a hub portion 89 in which is threaded a depending bolt 90. Located in chamber 86 and rotatable on bolt 90 is a double rotary unit combining a rotary bladed pump member 91 and induction motor rotor 92 which are secured to each other. This arrangement represents a simplification of the construction shown in the previous embodiment. Surrounding well 85 is the core 93 of the motor stator.

Figure 11:
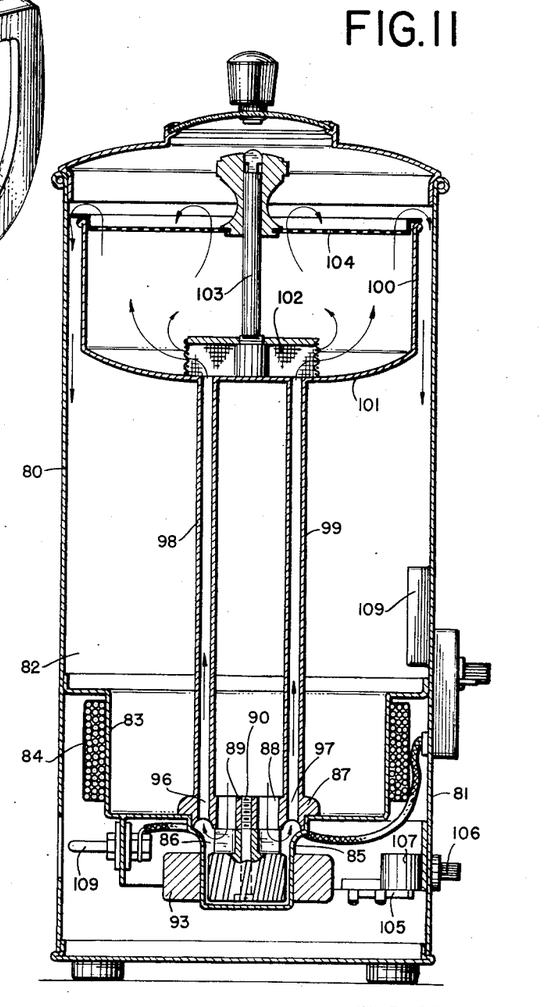
Fig. 11 is a vertical section of the same coffee maker taken at the line 11—11 of Fig. 10.
Figure 12:
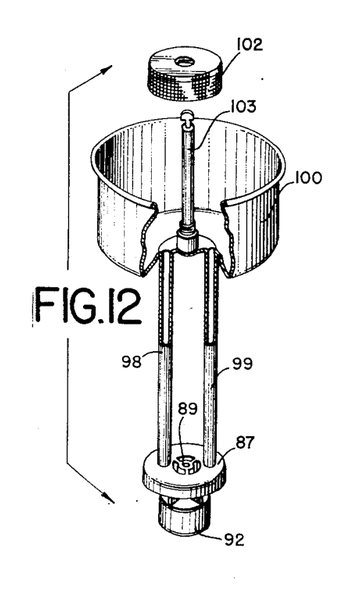
Fig. 12 is a perspective expanded view, partly in section, of the main parts of the pumping, circulating and infusing mechanism.
Figure 13:
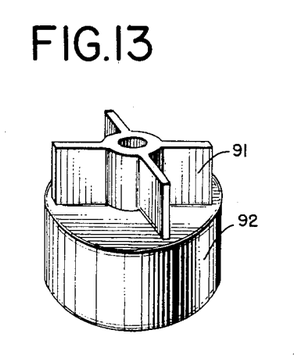
Fig. 13 is a perspective enlarged view of the pump and motor rotors.
Figure 14:
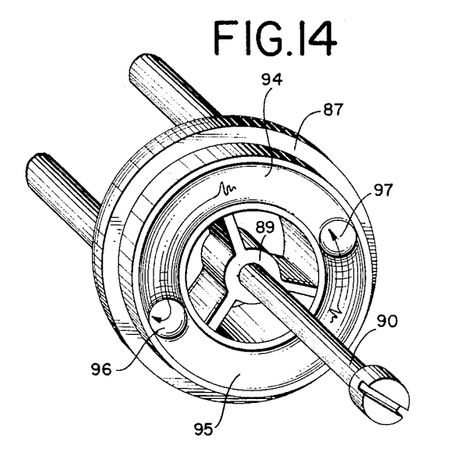
Fig. 14 is a perspective view of the underside of the pump assembly.

Cap 87 is formed at its underside with opposing grooves 94 and 95 of gradually increasing depth and terminating at their depth portions in liquid outlet ports 96 and 97. Upstanding from cap 87 are a pair of liquid delivery tubes or conduits 98 and 99 communicating at their lower end with chamber 86 through ports 96 and 97 at their upper end fixed to and discharging to the bottom of an imperforate walled coffee holding infusing receptacle or unit 100. In such unit the bed of coffee grounds seats on the bottom wall 101. Surrounding the outlet ends of tubes 98 and 99 is a screen housing 102 screw threaded on a supporting rod 103 upstanding from the center of unit 100. There is thus no danger of the coffee grounds clogging tubes 98 and 99. Detachably supported on rod 103 and closing the upper end of unit 100 is a perforate disc 104 flanged to seat on the top edge of the unit wall.

When the motor drives pump member 91 liquid from the storage chamber 82 is drawn through inlet ports 88 into chamber 86 and delivered upwardly through tubes 88 and 89 to infusion unit 100. On entering the unit the liquid flows outwardly through screen 102 and upwardly through the bed of coffee grounds, and thereafter leaves the unit through perforate disc 104 and flows downwardly back to storage chamber 82. It will be noted by reference to Fig. 12 that motor rotor 92, pump 96, tubes 88 and 89 and infusion unit 100 are assembled as a single unit of simple design which can be easily removed from the coffee maker and readily cleaned.

Figure 15:
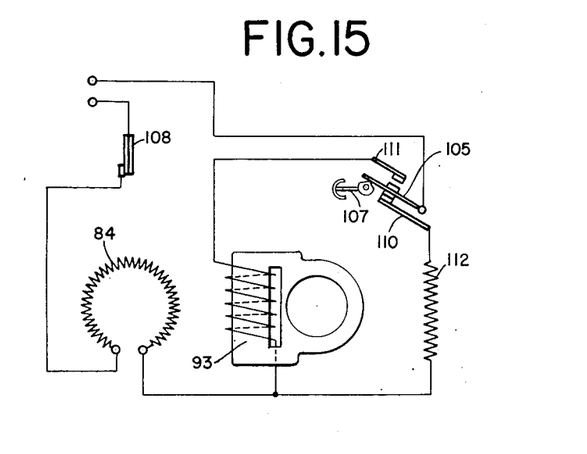
Fig. 15 is a diagrammatic view of the control circuit for the coffee maker of Fig. 10.

The controls for the present coffee maker are generally similar to those employed in the first embodiment, but a somewhat different circuit is employed. The pump motor is controlled by a switch 105 initially actuatable by a push button 106 operating through a pivoted arm 107. When the motor is energized arm 107 is magnetically held against the core 93 of the motor rotor. A thermostatic switch 108 is housed in a water tight casing 109 in the liquid storage chamber 82. When terminals 109 located in base 81 are connected with an electric power source heater 84 is immediately energized. Motor switch 105 at this time is in contact with switch arm 110 and short-circuits the motor. As soon as push button 106 actuates switch 105 the same is moved in contact with switch arm 11 resulting in energization of the motor and starting of the pump. When the circulation has continued for the required period thermostatic switch 108 opens in response to the temperature of the liquid storage chamber, and this immediately breaks the circuit to motor 93 to deenergize the same. Arm 107 which was magnetically held by the motor core is released to break the circuit between switch 105 and switch arm 111. Switch 105 returns to contact with switch arm 110 which establishes a new circuit to the heater through a resistance unit 112. The heater therefore does not discontinue operation as in the case of the first embodiment, but continues to operate at a low heat to maintain the infusion at the required temperature. Ordinarily the low heat produced will be adequate so that thermostatic switch 108 will not again close until a new infusing operation is started.

Whereas in the two embodiments which have been so far described the coffee maker base, heating unit and pump motor stator are permanently associated with the coffee making vessel, they can constitute a separate unit. The advantage of providing a removable base is that the coffee making vessel is lightened to make pouring easier and facilitate cleaning. Further, the coffee making vessel may be constructed of glass instead of metal. These points are illustrated in the embodiment of the invention shown in Figs. 16 to 22.

Figure 16:
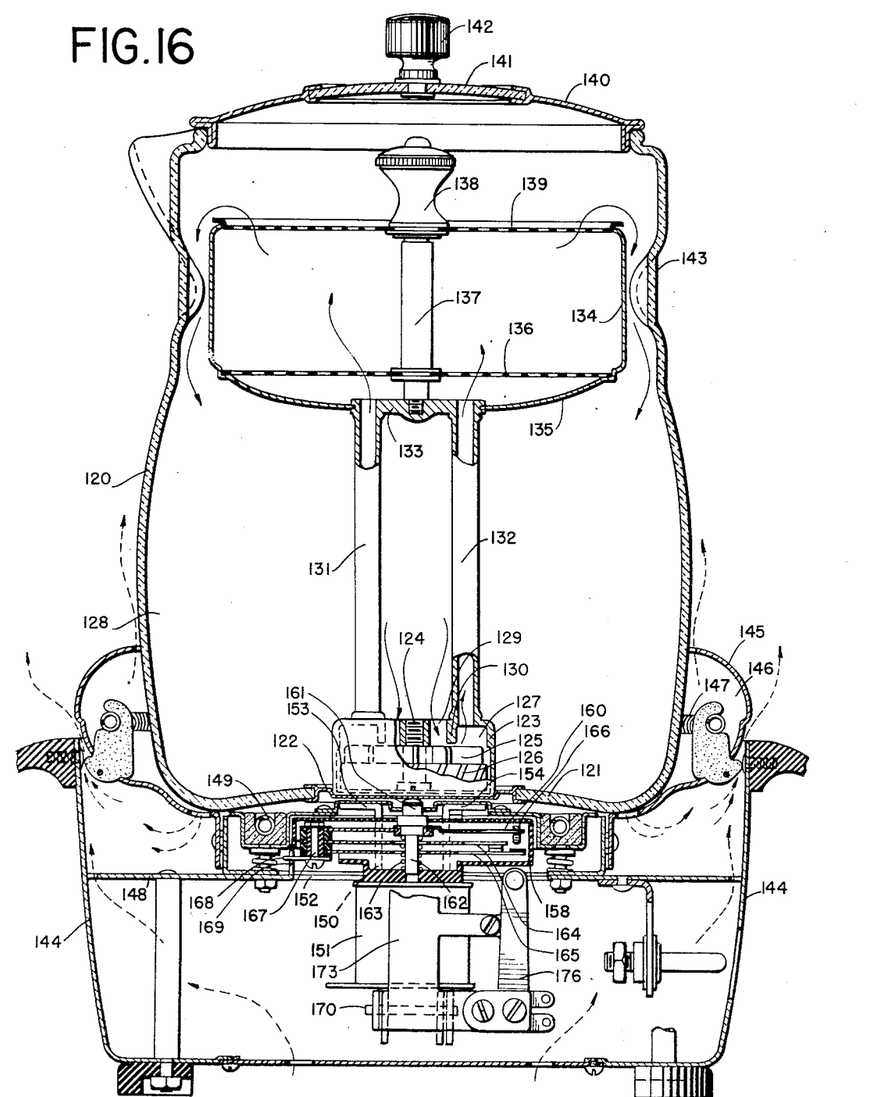
Fig. 16 is a vertical section of a third embodiment of the invention wherein the coffee maker is constructed of glass and detachably associated with an electric stove base.

In the latter embodiment the coffee making vessel 120 is constituted of glass. The bottom portion 121 thereof is made flat or slightly concave. Through use of a different form of pump motor it is unnecessary to provide a depending well. In the central portion of bottom 121 a cut-out is provided in which is sealed a thin flanged metal disc 122 for purposes hereafter to be described. Such disc is provided with a slight depression serving to removably seat and center a small closed housing 123. Rotatable in such housing on bolt 124 is a double rotary unit comprising a bladed pump member 125 and the rotor 126 of a shaded pole induction motor. Casing 123 forms a pump chamber 127 into which liquid from storage chamber 128 is delivered through a series of ports 129 which are surrounded by an annular flange 130. Upstanding from housing 123 are a pair of liquid circulating tubes 131 and 132 which at their upper ends are connected together by a flanged disc 133. Such disc forms a portion of the bottom of an imperforate walled infusion unit 134. Tubes 131 and 132 discharge into an entrance chamber 135 in the lower portion of the unit below a perforate disc 136 upon which the bed of coffee grounds are supported. Disc 136 is detachably mounted in the infusion unit by central rod 137 threaded into disc 133 mounted at the top of unit 134 on knob 138. Fixed to the top of rod 137 is a second perforate disc 139. As in the case of the previous embodiments liquid delivered by the pump through tubes 131 and 132 flows upwardly through infusion unit 134 and discharges through disc 139 and thence over the edge to return to storage chamber 129.

Vessel 120 may be provided with any suitable form of cover. In the present instance the same is provided with a metal cover 140 fitted with a central glass insert 141 mounting knob 142 and through which a view of the interior of the coffee maker is afforded. Vessel 120 may be provided with any suitable form of handle (not shown). The vessel may be formed with a circumferential reduced portion 143 adapted to receive a handle supporting band, such an arrangement being preferable because of the glass composition of the vessel.

Figures 18, 19, 20, 21, 22:
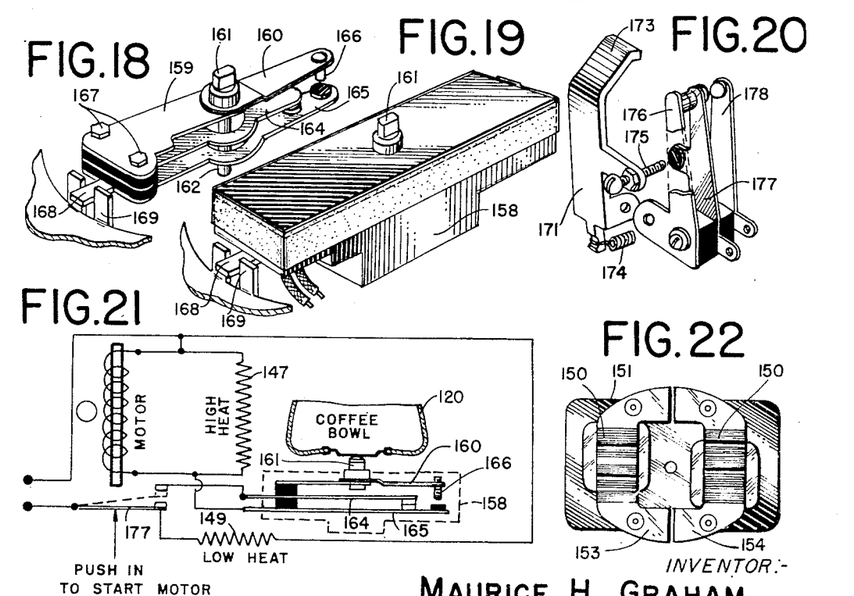
Fig. 18 is a perspective view of the thermostatic switch with the casing removed.
Fig. 19 is a corresponding perspective view of the thermostatic switch casing.
Fig. 20 is a perspective view of a further control switch.
Fig. 21 is a diagrammatic view of the wiring circuit employed with the coffee maker of Fig. 16.
Fig. 22 is a top plan view of the motor stator.

Removably mounted on coffee making vessel 120 is a base 144 of metal. Mounted in the upper portion of the base is a hollow flange 145 forming a housing 146 which is mounted on annular electric heating unit 147. Mounted on a transverse partition 148 in base 144 is a second electric heating unit 149. Heating unit 147 is a high temperature unit employed during the coffee making operation, while unit 149 is a low heat unit employed to maintain the infusion hot for an indefinite period thereafter. As before noted the stator 126 of the pump motor is located in housing 123 above the bottom 121 of the coffee making vessel. The motor stator for energizing the same is located in base unit 144 and comprises a U-shaped core 150, with its legs upturned and each surrounded by a field coil 151. Such stator is suspended by partition 148 and projects downwardly through a central opening 152 therein. As best shown in Fig. 22 a split annular ring comprising sections 153 and 154 is mounted on the upper ends of the legs of the motor stator, such ring being formed of magnetic material and serving to establish a magnetic field for operation of motor stator 126 and pump 125. Mounted in cutaway portions of the legs of core 150 below the ring are shading coils 155. Mounted on an annular flange 156 extending inwardly from auxiliary heating unit 149 is a thin disc 157 of nonmagnetic metal which serves as a protection for the upper end of the motor stator.

Supported between the legs of the motor stator is a non-magnetic casing 158 housing a thermostatic switch. As best shown in Fig. 18 such switch includes an upper arm 159 of low expansion metal such as Invar steel having secured thereto a bimetallic thermostatic strip 160. Secured to the arm in thermal relation with strip 160 is a silver upwardly projecting contact element 161. Depending from the heat conducting contact is a guide rod 162 journalled in the lower end of casing 158. Spring 163 serves to urge metal contact 161 upwardly so that the same will make proper thermal contact with metal disc 122 forming the central portion of bottom 121 of vessel 120. Disc 122 should be of thin non-magnetic metal so as not to interfere with the magnetic field between the stator and rotor of the pump motor and, also, so as to respond to temperature changes of the liquid within the liquid holding receptacle.

By further reference to Fig. 18 and Fig. 1 it will be noted that the upper thermostatic switch arm 159 is adapted to float in casing 158 so that accuracy in operation of the switch will be independent of vertical adjustment of contact pin 161. Mounted below arm 159 is a second arm 164 and spaced therebelow is a third arm 165. Depending from thermostatic arm 160 is a pin 166 adapted on heating to contact an insulated stud on lower arm 165 to move arm 165 away from arm 164 and break the electric circuit normally established by the contacts between such arms. (See Fig. 18.) It will be noted by Fig. 1 that arms 159, 164 and 165 are insulated from each other and secured together in spaced relation by bolt 167. Secured to bolt 167 and projecting laterally from casing 158 is a guide finger 168 received between a pair of upstanding wings 169 secured to partition 148. This arrangement serves to keep the thermostatic switch against swinging movement about rod 162 incident to upward and downward movement of contact pin 161.

Figure 17:
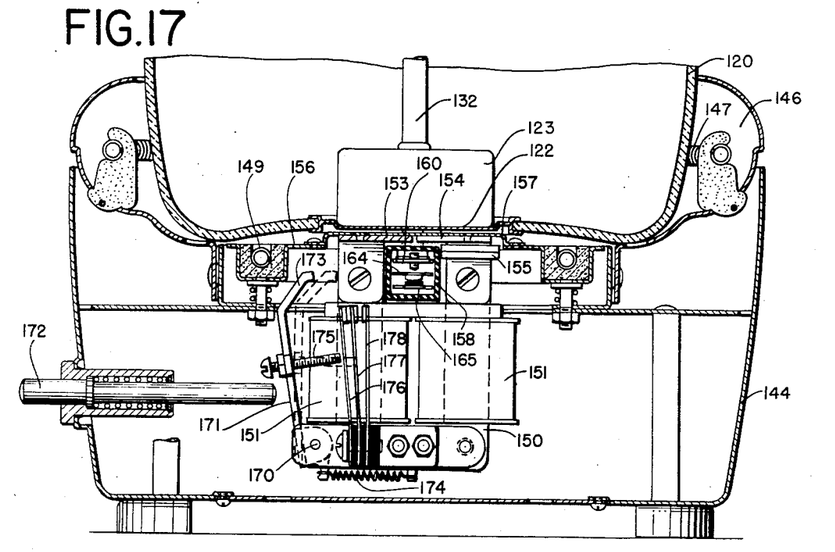
Fig. 17 is a fragmentary sectional elevation taken at right angles to Fig. 16.

Hinged to the lower portion of the motor stator by pin 170 is an arm 171 of magnetically-responsive material adapted to be moved inwardly by push button 172 from the full line to the dotted line position shown in Fig. 17. In the latter position the inturned upper end 173 of the arm is magnetically held against one arm of the motor stator when the latter is energized. A spring 174 normally tends to hold arm 171 in its left position. An adjustable stud 175 is mounted on arm 171 for actuating a control switch for the pump motor. Such switch includes normally contacting switch arms 176 and 177 and a third switch arm 178. When arm 171 is swung inwardly stud 175 pressing against arm 176 moves arm 177 into contact with arm 178. When the motor is deenergized arm 173 is swung to the left to break the circuit between arms 177 and 178. The circuit between arms 176 and 177 is maintained.

By reference to the wiring diagram of Fig. 21 the automatic operation of the coffee maker under description will be understood. When a source of electric power is connected the high heat coil 147 will be energized. By pushing in button 172 the switch actuated by arm 171 will be closed to energize the pump motor. At the end of the coffee making operation thermostatic switch 160 will depress arm 165 away from arm 164 to break the circuit to the motor and high heat coil 147. A circuit is provided through low heat coil 149 so that the infusion liquid is maintained hot for an indefinite period.

For the forms of coffee maker having a metal vessel it is preferred to use stainless steel or equivalent non-corrosive metal. The exterior may be plated with chromium, nickel or silver to enhance appearance. The metal parts of the pump unit will preferably be plated to resist deterioration. Plating of the infusion unit and the tubing between the pump unit and infusion unit also may be desirable in some instances, depending on the kind of metal employed therefor, but unplated rust-resisting metals such as aluminum may be employed for such parts.

The upflow infusion unit and the pumping mechanism of the invention both individually and mutually contribute to a faster and more efficient infusion of the coffee making liquid. Further, their construction is extremely simple and of light weight so as to make handling and cleaning easy. Whereas prior power driven pump coffee makers have been extremely cumbersome and awkward to handle, the present invention provides a coffee maker of such type having all the advantages of coffee makers where circulation depends upon heating and the addition of smooth and high velocity circulation of the liquid.

The embodiments of the invention herein described are merely illustrative, and the scope of the invention is to be determined according to the appended claims.

I claim:

1. A coffee maker comprising a liquid holding receptacle, a coffee holding infusion making receptacle in the upper portion of the liquid holding receptacle, liquid inlet means in the infusion making receptacle, a housing in the lower portion of the liquid holding receptacle, rotary pump means mounted in said housing for rotation about a vertical axis including a hub and pump blades projecting laterally outward from the hub, liquid inlet means located centrally of the top of the pump housing over the axial area of the pump means for delivering liquid from the liquid holding receptacle to said pump means, liquid outlet means in the pump housing located outwardly of said housing inlet means, and conduit means interconnecting said pump housing outlet means and said infusion making receptacle inlet means.

2. A coffee maker comprising a liquid holding receptacle, a coffee holding infusion making receptacle above the liquid holding receptacle, a pair of spaced inlet ports in the infusion making receptacle, a housing in the liquid holding receptacle, rotary pump means mounted in said housing for rotation about a vertical axis, liquid inlet means in the housing for delivering liquid from the liquid holding receptacle to said rotary pump means, a pair of liquid outlet ports in said housing located on opposite sides of the axis of rotation of the rotary pump means, and separate conduit means interconnecting the respective housing outlet ports with the infusion making receptacle inlet ports.

3. A coffee maker comprising a liquid holding receptacle, a coffee holding infusion making receptacle in the upper portion of the liquid holding receptacle, liquid inlet means in the infusion making receptacle, a housing in the lower portion of the liquid holding receptacle, rotary pump means mounted for rotation about a vertical axis in said housing including a hub and pump blades projecting laterally outward from the hub, liquid inlet means located centrally of the top of said housing over the axial area of the pump means for delivering liquid from the liquid holding receptacle downwardly to said pump means, liquid outlet means located in the housing top outwardly of said housing inlet means to which the pump means delivers upwardly, and conduit means interconnecting the pump housing outlet means and the infusion making receptacle inlet means.

4. A coffee maker comprising a liquid holding receptacle, a coffee holding infusion making receptacle in the upper portion of the liquid holding receptacle, a pump housing in the lower portion of the liquid holding receptacle, rotary pump means mounted in said housing for rotation about a vertical axis, liquid inlet means in the housing for delivering liquid from the liquid holding receptacle to the central area of said rotary pump means, a plurality of circumferentially spaced liquid outlet ports in said housing communicating with the outer area of said rotary pump means, and conduit means interconnecting the respective housing outlet ports with the infusion making receptacle inlet means.

5. A coffee maker comprising a liquid holding receptacle, a coffee holding infusion making receptacle in the upper portion of the liquid holding receptacle, liquid inlet means in the infusion making receptacle, a pump housing in the lower portion of the liquid holding receptacle, rotary pump means mounted for rotation about a vertical axis in said housing, liquid inlet means located centrally of the top of said housing for delivering liquid from the liquid holding receptacle downwardly to the central area of said pump means, an annular channel in the upper portion of said housing surrounding said housing inlet means and communicating with the outer area of the pump means, liquid outlet means located in the housing top communicating with said annular channel, and conduit means interconnecting the pump housing outlet means and the infusion making receptacle inlet means.

6. A coffee maker comprising a liquid holding receptacle, a coffee holding infusion making receptacle in the upper portion of the liquid holding receptacle, a hollow base supporting the receptacle, liquid inlet means in the infusion making receptacle, housing means forming a closed well projecting downwardly from the central area of the bottom of the liquid holding receptacle into the hollow base, a removable housing cover member overlying said well, rotary pump means mounted in said well for rotation about a vertical axis, liquid inlet means in said housing cover member for delivering liquid from the liquid holding receptacle to the pump means, liquid outlet means in said housing cover member, conduit means interconnecting said housing cover member outlet means and the infusion making receptacle inlet means, and power means mounted in the base concentric with the axis of the pump means for driving the pump means.

7. A coffee maker comprising a liquid holding receptacle, a coffee holding infusion making receptacle above the liquid holding receptacle, liquid inlet means in the infusion making receptacle, a housing removably mounted in the lower portion of the liquid holding receptacle, a rotary pump member rotatable about a vertical axis in said housing, central inlet means in the housing for delivering liquid from the liquid holding receptacle to the pump member, liquid outlet means in the housing located outwardly of said housing inlet means, and conduit means interconnecting said housing outlet means and the infusion making receptacle inlet means.

8. A coffee maker comprising a liquid holding receptacle, a coffee holding infusion making receptacle above the liquid holding receptacle, liquid inlet means in the infusion making receptacle, a housing located in the lower portion of the liquid holding receptacle and having a removable cover, a vertical shaft located centrally of said housing secured to and depending from the housing cover, a rotary pump member in the housing mounted on said shaft, liquid inlet means in the housing for delivery of liquid from the liquid holding receptacle to said pump member, liquid outlet means in the housing, and conduit means interconnecting said housing outlet means and the infusion making receptacle inlet means.

9. A coffee maker comprising a liquid holding receptacle, a coffee holding infusion making receptacle in the upper portion of the liquid holding receptacle, liquid inlet means in the lower portion of the infusion making receptacle, liquid outlet means for discharging liquid after infusion from the upper portion of the infusion making receptacle back to the liquid holding receptacle, a pump housing in the liquid holding receptacle, liquid inlet means in said pump housing having communicating with the liquid holding receptacle, magnetically-responsive pump means in said housing, actuating means located exteriorly of the liquid holding receptacle adapted to set up a magnetic field in said pump housing for driving said magnetically responsive pump means, and conduit means for delivering liquid from the pump housing to the infusion making receptacle inlet means.

10. A coffee maker comprising a liquid holding receptacle, a coffee holding infusion making receptacle above the liquid holding receptacle, a housing depending from the central bottom area of the liquid holding receptacle, a rotary pump member and an electric motor rotor for driving said pump member mounted in said housing for rotation about a vertical axis, an electric motor stator located below the liquid holding receptacle at the side of the depending housing in magnetic driving relation with said motor rotor in the housing, and conduit means for delivering liquid from said housing to the infusion making receptacle.

11. An electric coffee maker comprising a liquid holding receptacle, a hollow base supporting the liquid holding receptacle, electric heating means in said base for heating said receptacle, an electric motor stator in said base underlying the central area of the receptacle, an electric motor rotor located in the receptacle in magnetic driving relation with the motor stator in the base, pump means in the receptacle driven by the motor rotor, a coffee holding infusion making receptacle located in the upper part of the liquid holding receptacle having a liquid inlet in its lower portion opening beneath the position of the coffee, an outlet in the upper portion of the infusion making receptacle above the normal coffee level for discharging liquid after infusion back to the liquid holding receptacle, liquid conduit means interconnecting the pump means with the infusion making receptacle inlet means for delivering liquid to be infused from the liquid holding receptacle to the infusion making receptacle, and thermostatic control means controlling the operating period of the pump motor means and the electric heating means.

12. A coffee maker comprising a liquid holding receptacle, a hollow base supporting the receptacle, a coffee holding infusion making receptacle in the upper portion of the liquid holding receptacle, liquid inlet means in the lower portion of the infusion making receptacle, liquid outlet means in the upper portion of the infusion making receptacle delivering liquid after infusion back to the liquid holding receptacle, a closed housing in the lower portion of the liquid holding receptacle adjacent the base, rotary pump means and an electric motor rotor mounted in the housing for rotation about a vertical axis, inlet means in the housing for delivering liquid from the liquid holding receptacle to the pump means, conduit means interconnecting the housing with the liquid inlet means of the infusion making receptacle through which liquid is delivered by the pump means for infusion, and an electric motor stator in the base in magnetic driving relation with the motor rotor in the housing.

13. An electric coffee maker comprising a liquid holding receptacle, a hollow base supporting the liquid holding receptacle, electric heating means in said base for heating said receptacle, an electric motor stator in said base, an electric motor rotor located in the receptacle in magnetic driving relation with the motor stator in the base, pump means in the receptacle driven by the motor rotor, a coffee holding infusion making receptacle located in the upper part of the liquid holding receptacle having a liquid inlet in its lower portion opening beneath the position of the coffee, an outlet in the upper portion of the infusion making receptacle above the normal coffee level for discharging liquid after infusion back to the liquid holding receptacle, and liquid conduit means interconnecting the pump means with the infusion making receptacle inlet means for delivering liquid to be infused from the liquid holding receptacle to the infusion making receptacle.

14. In a coffee maker comprising a non-metallic liquid holding receptacle, an opening in the non-metallic bottom wall of the receptacle, an insert of non-magnetic metal fitted in said opening and making fluid tight engagement with the bottom wall of the receptacle, a hollow base supporting the receptacle, magnetically-responsive pump means in the receptacle immediately above the non-magnetic insert, actuating means in the base adjacent the non-magnetic insert in magnetic driving relation with the magnetically-responsive pump means, an infusion making receptacle in the upper portion of the liquid holding receptacle, conduit means for circulating liquid from the pump means to the infusion making receptacle, heating means in the hollow base for heating the receptacle, and thermostatic control means in the base in thermal conducting relation with the metal insert in the bottom of the receptacle controlling the pump actuating means and the heating means.

15. A coffee maker comprising a non-metallic liquid holding receptacle having an opening in the bottom wall thereof, a thin insert of non-magnetic metal closing said opening and making fluid tight engagement with the bottom wall of the receptacle, a hollow base supporting the receptacle, magnetically-responsive pump means in the receptacle overlying the metallic insert, actuating means in the base underlying said insert and in magnetic driving relation with the magnetically-responsive pumping means, a coffee holder in the upper portion of the receptacle, and means for circulating liquid from the pump means to the coffee holder.

MAURICE H. GRAHAM.

REFERENCES CITED

The following references are of record in the file of this patent:

UNITED STATES PATENTS

| Number | Name | Date |
|---|---|---|
| 378,296 | Ehrlich | Feb. 21, 1888 |
| 770,426 | Frank | Sept. 20, 1904 |
| 1,047,402 | Gefter | Dec. 17, 1912 |
| 1,067,206 | Wilkinson | July 8, 1913 |
| 1,167,775 | Miller | Jan. 11, 1916 |
| 1,226,005 | Rathman | May 15, 1917 |
| 1,471,752 | Rieckmann | Oct. 23, 1923 |
| 1,719,713 | Miller | July 2, 1929 |
| 1,789,334 | Englund | Jan. 20, 1931 |
| 1,972,164 | Pierce | Sept. 4, 1934 |
| 2,175,727 | Graham | Oct. 10, 1939 |
| 2,234,464 | Calder | Mar. 11, 1941 |

FOREIGN PATENTS

| Number | Country | Date |
|---|---|---|
| 4,400 | Great Britain | 1876 |
| 51,925 | Denmark | July 27, 1936 |
| 296,897 | Italy | May 30, 1932 |
| 674,259 | Germany | Apr. 11, 1939 |